United States Patent [19]

Jaeger

[11] 3,914,425

[45] Oct. 21, 1975

[54] ANTITUSSIVE CODEINE COMPOSITION

[75] Inventor: Karl Heinrich Jaeger, Obereggenen, Germany

[73] Assignee: Solco Basel AG, Birsfelden, Switzerland

[22] Filed: May 1, 1974

[21] Appl. No.: 465,890

[52] U.S. Cl. ............................. 424/260; 424/325
[51] Int. Cl.² ....................................... A61K 31/485
[58] Field of Search ......................... 424/260, 325

[56] References Cited
UNITED STATES PATENTS 1,845,486  2/1932  Crossley.............................. 424/260
2,027,722  1/1936  Diehl ................................. 424/260

OTHER PUBLICATIONS

Chemical Abstracts 68:117139x (1968).

*Primary Examiner*—Norman A. Drezin
*Attorney, Agent, or Firm*—Hans Berman

[57] ABSTRACT

The antitussive effect of codeine, orally administered in the form of its pharmaceutically acceptable salts, is enhanced by the simultaneous administration of acid addition salts of heptaminol (6-amino-2-methyl-2-heptanol), a compound lacking antitussive effects of its own which does not enhance the constipating and addictive effects of codeine.

2 Claims, No Drawings

ANTITUSSIVE CODEINE COMPOSITION

This invention relates to antitussive compositions, and particularly to antitussive compositions containing codeine in the form of its pharmaceutically acceptable salts as an active ingredient.

The antitussive effect of codeine has been known for a long time. However, codeine produces undesirable side effects including constipation and intestinal spasms. Moreover, continued administration of codeine may cause addiction.

It has now been found that 6-amino-2-methyl-2-heptanol, hereinafter referred to as heptaminol, a relatively non-toxic compound lacking antitussive effects of its own, can enhance the effect of codeine so that the codeine dosage and the associated side effects may be reduced sharply while achieving a desired antitussive effect.

Heptaminol is known to enhance the systolic contraction of the heart muscle, to relieve arterial hypotension, and to increase the rate of blood flow through the coronary artery. Heptaminol has been used clinically in the form of its water-soluble acid addition salts, and is used for this invention in the same form.

The effect of mixtures of codeine and heptaminol salts was readily demonstrated in the anesthesized cat by the method of R. Domenjoz (Archiv fuer experimentelle Pathologie und Pharmakologie 215 [1952]19). Cough reflexes were initiated in test animals by electrical stimulation of the superior laryngeal nerve, the strength of the electric shock being adjusted to produce a cough reflex 8 to 10 minutes after intravenous injection of codeine hydrochloride in an amount of 1 mg/kg. A mixture of 1 mg each of codeine hydrochloride and heptaminol hydrochloride suppressed the cough reflex under the same conditions for an average period of 16 minutes in 12 tested cats. Mixtures of 1 mg codeine hydrochloride with 2 and 3 mg heptaminol hydrochloride under otherwise identical conditions suppressed the cough reflex for an average of 18 and 20 minutes respectively. The drop in blood pressure measured in the carotid artery after injection of codeine alone was not observed when heptaminol was administered simultaneously.

These and other tests indicate that the dosage of codeine can be reduced by about 40% without loss in antitussive effects by administering heptaminol jointly with the codeine. Heptaminol neither produces intestinal side effects when administered alone, nor does it enhance the intestinal side effects of codeine. Heptaminol also does not increase the risk of codeine addiction which is minimal at the small dosage rates of codeine effective against cough in the presence of heptaminol.

Although the afore-described method of Domenjoz permits the synergistic effects of codeine and heptaminol to be established at very small amounts of heptaminol, an antitussive composition containing codeine and heptaminol in the form of their salts or acid addition salts should preferably contain the two active ingredients in a weight ratio of at least one part of heptaminol acid addition salt per part of codeine salt, but little further improvement, if any, is observed when the heptaminol addition salt amounts to more than four times the weight of the codeine salt, although no unfavorable effects result from a higher ratio. The normal rate of single administration of heptaminol combined with reduced amounts of codeine is thus approximately 15 mg to 50 mg in adults.

The mixtures of codeine and heptaminol salts according to the invention are usually administered orally with solid or liquid excipients and may contain expectorants and other therapeutic agents conventional in cough medicines. Tablets or pills should contain 3 mg to 20 mg codeine salt and 5 mg to 50 mg heptaminol acid addition salt in the absence of other antitussive medication. The nature of the acid in the salts is irrelevant if it does not produce side effects of its own, that is, any pharmaceutically acceptable acid may provide the anionic component of the codeine or heptaminol salt. The chloride, sulfate, and phosphate of codeine are most conveniently available, as are the hydrochloric and sulfuric acid addition salts of heptaminol.

When it is desired to provide cough relief for an extended period by administration of a single dose of codeine and heptaminol, the active ingredients may be incorporated in solid compositions from which they are released gradually during passage through the intestinal tract.

The following Examples further illustrate the invention.

EXAMPLE 1

1400 g Codeine hydrochloride and 1400 g heptaminol hydrochloride in powder form where mixed intimately with each other and with corn starch and a small amount of magnesium stearate to permit granulation, and the granules were fed to a tableting machine which converted the mixture to 200,000 tablets, each containing 7 mg codeine hydrochloride and 7 mg heptaminol hydrochloride.

A mixture of 1450 g codeine phosphate and 2900 g heptaminol hydrochloride was similarly converted to 200,000 tablets.

The tablets so produced were coated with sugar and were suitable for application in pediatric practice for use where 10 – 12 mg codeine salt would previously have been used.

EXAMPLE 2

3600 g Codeine phosphate and 3600 g heptaminol sulfate were mixed intimately and converted with solid excipient in a conventional manner to 100,000 coated, three-layer pills. Each pill had a core containing 12 mg each of the active ingredients and was covered with an enteric coating which resisted absorption for two to three hours after oral ingestion. An intermediate layer containing 6 mg each of the two active ingredients was protected by a thin coating which dissolved after about 20 minutes in the digestive tract, and the outer layer contained 18 mg codeine phosphate and an equal amount of heptaminol sulfate.

Single three-layer pills provided many adult patients with several hours of sleep uninterrupted by coughing when taken at bedtime.

EXAMPLE 3

A cough sedative was prepared by mixing 60 g codeine phosphate, 200 g heptaminol hydrochloride, and 130 kg syrup simplex (specific gravity 1.32) with orange flavoring, homogenizing the mixture, and dividing it into 1000 individually bottled portions.

The normal dosage rate is one to two teaspoons for children, two to three teaspoons for adults, each teaspoon amounting to 5 ml or 3 mg codeine phosphate and 10 mg heptaminol hydrochloride.

Conventional cold preparations containing codeine may additionally contain antihistamines such as triprolidine hydrochloride, decongestants such as pseudoephedrine hydrochloride, and expectorants, such as glyceryl guaiacolate. 40 Percent of the codeine in such preparations may be replaced by heptaminol according to this invention without decreasing antitussive potency while reducing the side effects of the codeine. The heptaminol may benefit the patient by contributing its known physiological effects.

A mixture of a pharmaceutically acceptable salt of codeine with a pharmaceutically acceptable acid addition salt of heptaminol in an amount sufficient to enhance the antitussive effect of the codeine salt may thus be employed generally to replace a larger amount of codeine salt. Where only codeine salts were employed heretofore in dosage unit form, the mixture of the invention is formulated to provide 3 mg to 20 mg of codeine salt per dosage unit, 5 mg to 50 mg acid addition salt of heptaminol, together with a suitable amount of solid or liquid excipient. For extended action, 6 mg to 80 mg codeine salt may be combined with 10 mg to 200 mg heptaminol acid addition salt together with solid excipient which includes means for retarding the release of active ingredients when received in the human intestinal tract in the manner illustrated in Example 2.

What is claimed is:

1. An antitussive composition containing, as active ingredients, a pharmaceutically acceptable salt of codeine and a pharmaceutically acceptable acid addition salt of 6-amino-2-methyl-2-heptanol, the amount of said acid addition salt being at least equal to but not greater than four times the weight of said salt of codeine.

2. A composition as set forth in claim 1, wherein said salt of codeine is the phosphate, sulfate, or hydrochloride, and the acid in said acid addition salt is hydrochloric or sulfuric acid.

* * * * *